UNITED STATES PATENT OFFICE.

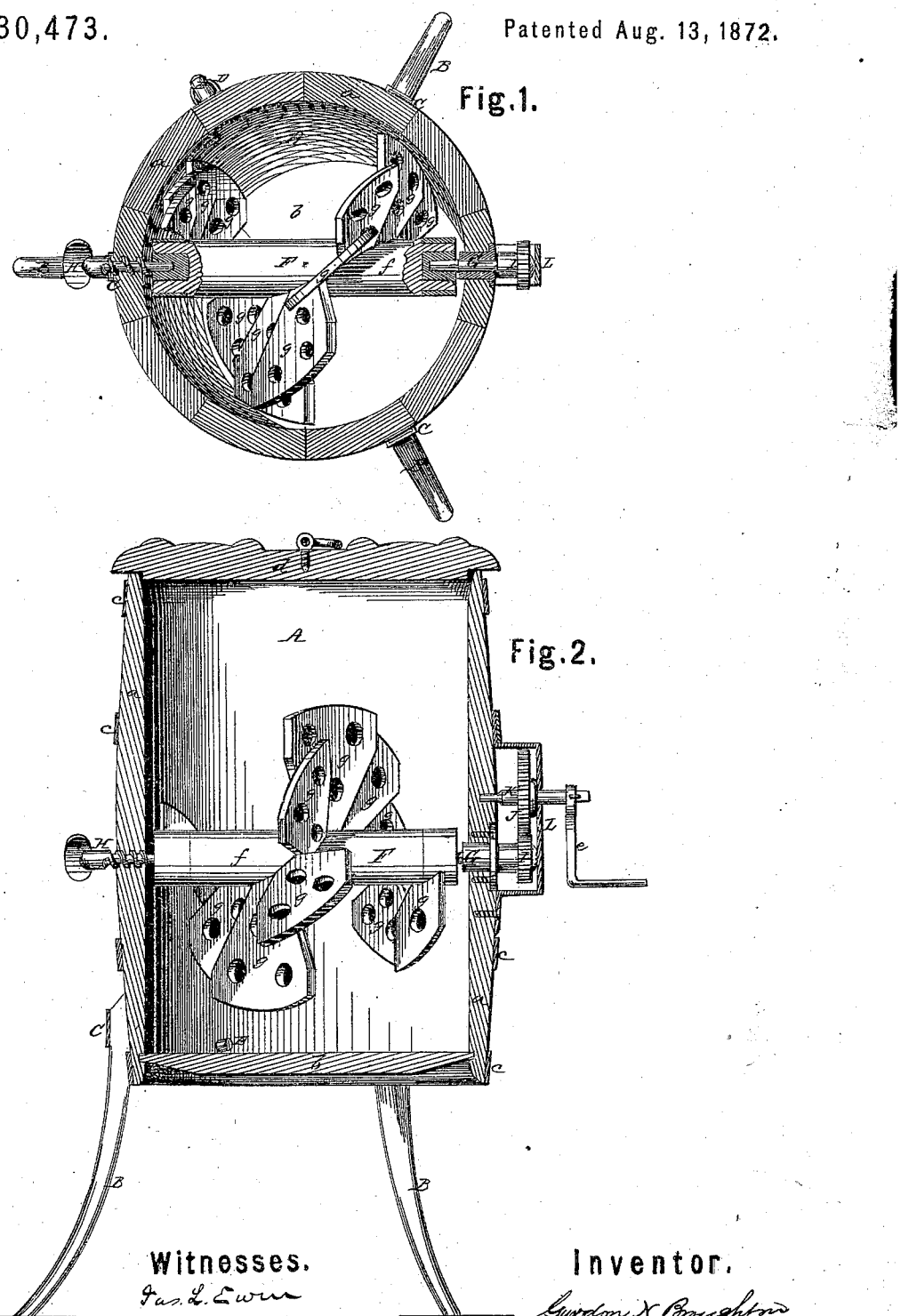

GURDON N. BROUGHTON, OF BELLEFONTAINE, OHIO.

IMPROVEMENT IN CHURNS.

Specification forming part of Letters Patent No. 130,473, dated August 13, 1872.

Specification describing an Improved Churn, invented by GURDON N. BROUGHTON, of Bellefontaine, in the county of Logan and State of Ohio.

Nature and Objects of the Invention.

This invention relates to that class of churns in which the agitation is effected by means of an immersed horizontal dasher in a vertical barrel, the dasher being rotary and so journaled as to be readily detached.

The invention consists primarily in a peculiar construction of dasher; and, further, in a peculiar general construction, to secure superior efficiency.

Description of the Drawing.

Figure 1 is a horizontal section of the improved churn. Fig. 2 is a vertical longitudinal section of the same.

General Description.

The barrel A of this churn is composed of staves $a$, bottom $b$, hoops $c$, and a cover, $d$, the staves being so cut as to form a plane cylindrical chamber, while externally they are of bulging shape to receive the hoops $c$. The barrel is supported at convenient height by three flaring legs, B, attached by tapering angular socket-brackets C. The barrel is further provided at bottom with a spout, D, and a plug, E, by which to empty the same. The rotary dasher F is journaled transversely of the barrel at about mid-height between a stud shaft or spindle, G, and a stud-screw, H, in common manner. By adjusting the latter the dasher may be withdrawn from the tub. The spindle G is furnished with a pinion, I, to mesh with a spur-wheel, J, on a parallel shaft, K, the outer end of which is journaled in a bracket, L, and furnished with a hand-crank, $e$. The bracket L partially incloses and guards the gearing. The dasher F is composed of a wooden shaft, $f$, strengthened by metallic bushings and ferrules and perforated blades $g$, of wood or metal, set obliquely in a spiral series around the shaft, the same being proportioned and conformed to the diameter and circular shape of the barrel.

Operation.

The dasher, in operation, is immersed and receives a rapid movement in either direction or back and forth from the crank-shaft K, through the multiplying-gearing I J and spindle G, the action of each blade being continuous. The vertical rotation of the cream with the dasher being resisted by the shape of the barrel, the perforated blades $g$ pass through the mass, while they crowd the same against the back or front of the barrel as an abutment.

When the operation is finished, the dasher may be taken out by unscrewing the stud H, and the milk drawn off at the spout D by withdrawing the plug E.

The gearing is never deranged, and may be completely inclosed.

Claims.

The following is claimed as new:

1. The horizontal rotary dasher E, having the perforated blades $g$ arranged obliquely and spirally around its shaft $f$, and constructed as herein shown and described, for the purpose specified.

2. The improved churn composed of the vertical barrel A, with cylindrical chamber and external bulge, the legs B, leg-sockets C, spout D, plug E, horizontal rotary dasher F, spindle G, stud-screw H, multiplying-gearing I J, crank-shaft K, and gearing-bracket L, constructed, combined, and arranged substantially as herein shown and described, for the purposes set forth.

GURDON N. BROUGHTON.

Witnesses:
R. H. ST. JOHN,
PHILANDER JONES.